United States Patent [19]
Hawkins et al.

[11] Patent Number: 5,852,748
[45] Date of Patent: Dec. 22, 1998

[54] PROGRAMMABLE READ-WRITE WORD LINE EQUALITY SIGNAL GENERATION FOR FIFOS

[75] Inventors: Andrew L. Hawkins; Pidugu L. Narayana; Roland T. Knaack, all of Starkville, Miss.

[73] Assignee: Cypress Semiconductor Corp., San Jose, Calif.

[21] Appl. No.: 578,209

[22] Filed: Dec. 29, 1995

[51] Int. Cl.$^6$ .............................. G11C 7/00; G11C 15/00
[52] U.S. Cl. .......................... 395/874; 395/872; 395/875; 395/876; 395/877; 365/220; 365/221; 365/189.01; 365/189.04; 365/189.08
[58] Field of Search .................................. 395/250, 842, 395/843, 872, 873, 875–881, 874–877; 365/189.01, 189.04, 189.07, 189.02, 78, 219–222, 184, 230, 189.05

[56] References Cited

U.S. PATENT DOCUMENTS

| | | | |
|---|---|---|---|
| 4,467,443 | 8/1984 | Shima | 711/208 |
| 4,802,122 | 1/1989 | Auvinen et al. | 365/154 |
| 4,839,866 | 6/1989 | Ward et al. | 365/211 |
| 4,847,812 | 7/1989 | Lodhi | 365/221 |
| 4,864,543 | 9/1989 | Ward et al. | 365/221 |
| 4,875,196 | 10/1989 | Spaderna et al. | 365/238 |
| 4,888,739 | 12/1989 | Frederick et al. | 365/211 |
| 4,891,788 | 1/1990 | Kreifels | 365/49 |
| 4,942,553 | 7/1990 | Daltymple et al. | 364/900 |
| 4,985,867 | 1/1991 | Ishii et al. | 365/221 |
| 5,084,837 | 1/1992 | Matsumato et al. | 395/858 |
| 5,088,061 | 2/1992 | Golnabi et al. | 365/189.01 |
| 5,097,442 | 3/1992 | Ward et al. | 365/78 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 362/221 |
| 5,265,063 | 11/1993 | Kogure | 365/233 |
| 5,267,191 | 11/1993 | Simpson | 365/78 |

(List continued on next page.)

FOREIGN PATENT DOCUMENTS

| | | |
|---|---|---|
| 0113996 | 8/1989 | Japan . |
| 0676559 | 6/1994 | Japan . |

OTHER PUBLICATIONS

K. Kittrell, 1K×9X2 Asynchronous FIFOs SN74ACT2235 and SN74ACT2236, Sep. 1995, 1–3,5–9.

Andrew Hawkins et al., U.S.S.N. 08/567,918 State Machine Design for Generating Half–Full and Half–Empty Flags in an Asynchronous FIFO, filed Dec. 6, 1995.

Andrew Hawkins et al., U.S.S.N. 08/577,712 Circuit for Generating Almost Full and Almost Empty Flags in Asynchronous and Synchronous FIFOs, filed Dec. 22, 1995.

Andrew Hawkins et al., U.S.S.N. 08/567,893, State Machine Design for Generating Empty and Full Flags in an Asynchronous FIFO, filed Dec. 6, 1995.

Pidugu Narayana et al., U.S.S.N. 08/615,718 Signal Generation Decoder Circuit and Method, filed Mar. 13, 1996.

Pidugu Narayana et al., U.S.S.N. 08/666,751 Half–Full Flag Generator for Synchronous FIFOs, filed Aug. 2, 1996.

P. Forstner, FIFOs With a Word Width of One Bit, First–In, First–Out Technology, Mar. 1996, pp. 1–24.

(List continued on next page.)

*Primary Examiner*—Parshotam S. Lall
*Assistant Examiner*—Bharat Barot
*Attorney, Agent, or Firm*—Maiorana & Acosta, P.C.; Christopher P. Maiorana

[57] ABSTRACT

The present invention provides a circuit for generating a programmable write-read word line equality signal in FIFO buffers. The present invention significantly reduces the gate delay associated in producing the write-read word line equality signal. The delay is reduced from a typical 30–50 gate delays, to as little as four gate delays. The present invention accomplishes this by processing several bit operations in parallel and making the general circuit architecture symmetric. The delay is constant in all of the parallel paths but amounts to only a short delay for the final WREQ output.

13 Claims, 2 Drawing Sheets

U.S. PATENT DOCUMENTS

| | | | |
|---|---|---|---|
| 5,305,253 | 4/1994 | Ward | 365/73 |
| 5,311,475 | 5/1994 | Huang | 365/221 |
| 5,315,184 | 5/1994 | Benhamida | 307/518 |
| 5,317,756 | 5/1994 | Komatsu et al. | 395/898 |
| 5,345,419 | 9/1994 | Fenstermaker et al. | 365/221 |
| 5,355,113 | 10/1994 | McClure | 340/146.2 |
| 5,357,236 | 10/1994 | McClure | 340/146.2 |
| 5,365,485 | 11/1994 | Ward et al. | 365/221 |
| 5,367,486 | 11/1994 | Mori et al. | 365/189.05 |
| 5,375,092 | 12/1994 | Taniguchi et al. | 365/221 |
| 5,381,126 | 1/1995 | McClure | 340/146.2 |
| 5,404,332 | 4/1995 | Sato et al. | 365/201 |
| 5,406,273 | 4/1995 | Nishida et al. | 340/825.51 |
| 5,406,554 | 4/1995 | Parry | 370/381 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,473,756 | 12/1995 | Traylor | 395/877 |
| 5,490,257 | 2/1996 | Hoberman et al. | 711/100 |
| 5,495,451 | 2/1996 | Cho | 365/221 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,513,318 | 4/1996 | van de Goor et al. | 395/185.01 |
| 5,519,701 | 5/1996 | Colmant et al. | 370/60.1 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,557,575 | 9/1996 | Lee | 365/221 |
| 5,619,681 | 4/1997 | Benhamida et al. | 395/500 |
| 5,623,449 | 4/1997 | Fischer et al. | 315/200 |
| 5,625,842 | 4/1997 | Dalrymple | 395/842 |
| 5,627,797 | 5/1997 | Hawkins et al. | 365/221 |
| 5,642,318 | 6/1997 | Knaack et al. | 365/201 |
| 5,673,234 | 9/1997 | Hawkins et al. | 365/239 |
| 5,682,554 | 10/1997 | Harrell | 395/877 |

OTHER PUBLICATIONS

T. Jackson, FIFO MEmories: Solution to Reduce FIFO Metastability, First–In, First–Out Technology, Mar. 1996, pp. 1–6.

T. Jackson, Advanced Bus–Matching/Byte–Swapping Features for Internetworking FIFO Applications, Mar. 1996, pp. 1–3, 5–12.

T. Jackson, Parity–Generate and Parity–Check Features for High Bandwidth–Computing FIFO Applications, Mar. 1996, pp. 1–3, 5–8.

T. Ishii et al., High–Speed, High–Drive SN74ABT7819 FIFO, Mar. 1996, pp. 1–3, 5–12.

C. Wellheuser et al., Internetworking the SN74ABT3614, Mar. 1996, pp. 1–21.

C. Wellheuser, Metastability Performance of Clocked FIFOs, 1996, pp. 1–3, 5–12.

High Speed CMOS 256x36x2 Bi–direction FIFO, QS725420A, MDSF–00018–01, Apr. 24, 1995, pp. 1–36.

High–Speed CMOS 4Kx9 Clocked FIFO with Output Enable, QS7244A, MDSF–00008–05, Jun. 6, 1995, pp. 1–12.

High Speed CMOS 1Kx36 Clocked FIFO with Bus Sizing, QS723620, MDSF–00020–00, Jul. 17, 1995, pp. 1–36.

Cypress Preliminary CY7C 4425/4205/4215/CY7C4225/4235/4245 64, 256, 512, 1K, 2K, 4Kx18 Synchronous FIFOs, pp. 5–67–5–82.

A. Hawkins et al., Circuit for Generating Almost Full and Almost Empty Flags in Asynchronous and Synchronous FIFOS, Filed in U.S. PTO Dec. 22, 1995, S.N. 08/577712, Attorney Docket No. 64,663–016.

PROGRAMMABLE READ-WRITE WORD LINE EQUALITY SIGNAL GENERATION FOR FIFOS

FIELD OF THE INVENTION

This invention relates to FIFO buffers generally and more particularly to a method for generating a write-read word line equality signal in FIFO buffers.

BACKGROUND OF THE INVENTION

Most of the currently available high speed first-in first-out (FIFO) buffers employ look-ahead architecture in the data and flag generation paths. The look-ahead cycles in the data path are continuously increasing because of the growing density of FIFO memory arrays. The increased FIFO memory array density is a direct result of smaller memory cell sizes and an increase in the number of cells in each column which results in both more capacitance as well as a reduced drive on the bit lines. The FIFOs typically work around the slow memory array access time caused by the increased capacitance (and reduced drive) by reading a few cycles ahead of when the word is actually needed. However, in fall through conditions (i.e. a read immediately following the first write in an empty FIFO), the unavailability of the extra look-ahead cycles causes the access time to be even more adversely affected. Most of the prior art architectures work around this problem by performing some variation of special processing when the read and write pointers are close. Several typical special processing techniques could include shorting the write and read bit lines or driving the same data on both the read and write bit lines thus increasing the sense amplifier gain. Variations or combinations of these techniques could be implemented. Such combinations would still be targeted to reduce the fall through access time. The WREQ is an internal signal which controls the turning ON and OFF of whatever special processing technique is implemented. Typically this signal is generated either by using hot encoded shift-registers with additional combinatorial logic or by using counters with direct decode logic.

Typically the row selection within the FIFO memory array is done by a hot encoded shift register which activates a particular row. In these architectures, the WREQ signal is generated by implementing a logical AND of the corresponding read and write shift register bits and then implementing a logical OR of these outputs. This architecture is only limited to very small FIFOs but is impractical for larger FIFOs because of the increasing complexity of the AND/OR network generated by the increased number of memory array rows.

Counter architectures typically employ two counters one each for the read and write clocks. These two counters are reset to zero upon master reset and incremented based only on their respective clocks. The WREQ signal is directly decoded from the counter outputs by discarding a few LSB bits based on the architecture and the number of look-ahead cycles. The number of look-ahead cycles is typically limited to one with this architecture. But by implementing additional registers with this signal, one can overcome the limitation of one cycle. The design of the registers to remove this limitation is very design intensive. Additionally, the number of look-ahead cycles would be limited to a power of 2 (i.e.2 to the I). The greatest limitation is the practicality of designing this circuit for greater than one look-ahead cycle.

The present invention breaks this limitation and demonstrates a very flexible way of generating the WREQ signal with any number of look-ahead cycles, including non-powers of two. Additionally the output signal is completely combinatorial, and be easily adopted to any memory array configurations.

SUMMARY OF THE INVENTION

The present invention provides a circuit for generating a programmable write-read word line equality signal in FIFO buffers. The present invention significantly reduces the gate delay associated in producing the write-read word line equality signal. The delay is reduced from a typical 30–50 gate delays, to as little as four gate delays. The present invention accomplishes this by processing several bit operations in parallel and making the general circuit architecture symmetric. The delay is constant in all of the parallel paths but amounts to only a short delay for the final WREQ output.

Objects, features and advantages of the present invention are to provide a method for generating a write-read word line equality signal for use with both synchronous and asynchronous FIFOs. The method produces the desired signal with extremely short delays, allows the flexibility to generate the read-write equality signal for any number of look-ahead cycles, can be very easily adopted to different memory organizations with minimal design changes, is less prone to errors, consumes less chip real estate, is less prone to glitches because of symmetry, is very easy to lay out and can be easily adopted to denser FIFOs.

DESCRIPTION OF THE PREFERRED EMBODIMENT

Figure 1:
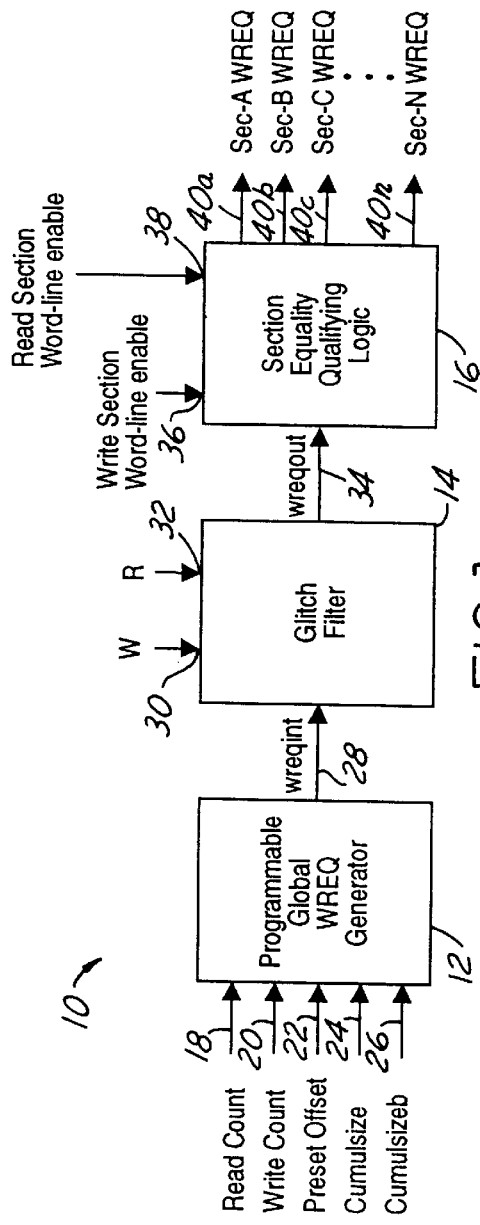
FIG. 1 is a block diagram of the overall architecture of the present invention.

Referring to FIG. 1, a write-read word line equality signal (WREQ) generator 10 is shown. The WREQ generator 10 generally comprises a programmable global WREQ generator 12, a glitch filter 14 and a section equality qualifying logic block 16. The programmable global WREQ generator 12 incorporates the circuitry of copending application "Circuit For Generating Almost Full And Almost Empty Flags In Asynchronous And Synchronous FIFOs"(Ser. No.08/577, 712 filed on Dec. 14, 1995 and assigned to the common assignee of the present invention still pending) and is hereby incorporated by reference. The programmable global WREQ generator 12 has an input 18 that receives a read count signal, an input 20 that receives a write count signal, a preset offset input 22, a cumulsize input 24 and a cumulsizeb input 26. The read count input 18 represents a read counter received from the FIFO (not shown). The write count input 20 represents a write counter received from the FIFO. The preset offset input 22 represents a programmed look-ahead offset which is equal to the number of words in a section plus the number of read look-ahead cycles. While the preset offset input 22 is programmable, it is preferably programmable at the silicon level through a metal mask or other reprogramming technique during fabrication. This allows preproduction programming of the preset offset input 22 while eliminating the danger of having an end user, not familiar with the programming of the preset offset input 22, program an undesirable offset value.

The cumulsize input 24 and the cumulsizeb input 26 provide control information to specify the selected size of the FIFO to be implemented. This control information is necessary when using the production technique of making a single FIFO memory array that is large enough to accommodate the design criteria of many applications. After production of the device, or during the last step of production of the device, the inputs 24 and 26 are used to disable portions of the FIFO memory array that are not necessary for the selected FIFO size. This technique reduces the overall cost of manufacturing the FIFO since a single FIFO die can be used to realize many different sizes of FIFOs.

The programmable global WREQ generator 12 presents an output signal WREQint 28 to the glitch filter 14. The glitch filter 14 also receives an input 30 from an external write clock W and an input 32 from an external read clock R. The glitch filter 14 presents a WREQOUT output 34 to the section equality qualifying logic 16. The section equality qualifying logic 16 also receives a first bus input 36 that represents a number of write section word line enable signals and a second bus input 38 that represents a number of read section word line enable signals. The glitch filter 14 is described in more detail with respect to FIG. 2 and the section equality qualifying logic 16 is described in more detail with respect to FIG. 3.

Figure 2:
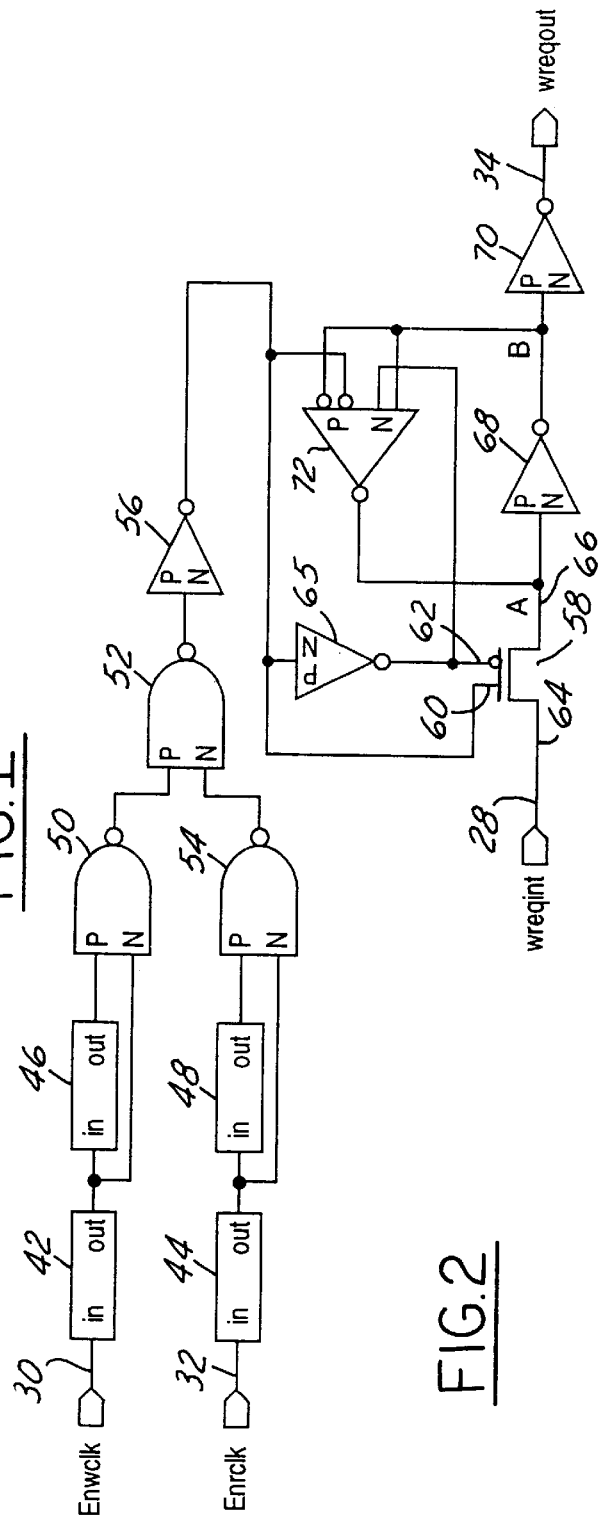
FIG. 2 is a schematic of the glitch filter logic

Referring to FIG. 2, a diagram of the glitch filter 14 is shown. The input 30 representing the external write clock W is designated as an enabled write clock Enwclk. Similarly the input 32 representing the external read clock R is designated as an enabled read clock Enrclk. The input 30 is presented to a delay block 42 that provides a four gate delay to the enabled write clock signal Enwclk. Similarly, a delay block 44 receives the input 32 and provides a four gate delay to the enabled read clock signal Enrclk. A delay block 46 receives the delayed enabled write clock signal Enwclk from the delay block 42 and provides an additional three gate delays. Similarly, a delay block 48 receives the delayed enable read clock signal Enrclk from the delay block 44 and provides an additional three gate delays. A NAND gate 50 receives a first input from the delay block 46 and a second input from the delay block 42 and presents a first input to a NAND gate 52. A NAND gate 54 receives a first input from the delay block 48 and a second input from the delay block 44 and presents a second input to the NAND gate 52. The function of the delay blocks 42, 44, 46 and 48 as well as the NAND gates 50, 52 and 54 is to generate a delayed mono-shot. The delay blocks 42 and 44 provide an initial four gate delay, while the delay blocks 46 and 48 hold the output of the NAND gate 52 for an additional three gate delays. Using an active low logic, the output of the NAND gates 50 or 54 would be a logic high for the duration of the three gate delays provided by the delay blocks 46 and 48. An inverter 56 receives the output of the NAND gate 52 and presents an output of the opposite digital state, specifically a digital zero during the duration of the three gate hold duration provided by the delay block 46 and 48. It should be noted that the number of gates in the delay blocks 42 and 44 are identical. Similarly, the number of gates in the delay blocks 46 and 48 are identical.

It should be appreciated that the three and four gate delays described are the presently preferred embodiment. Other gate delays could be implemented without departing from the spirit of the present invention.

A CMOS pass gate 58 receives the output of the inverter 56 at an NMOS input 60. Additionally a p-gate input 62 receives an input from the inverter 56 through the inverter 65. The CMOS pass gate 58 receives the output signal WREQint 28 at a source input 64. The CMOS pass gate 58 presents a drain output 66 to an inverter 68. The inverter 68 presents an output to an inverter 70 which presents the WREQOUT output 34. The output of the inverter 68 is additionally presented to the inverting gate inputs of an enabled inverter 72. Additionally, the enabled inverter 72 has a p-enable input that receives a signal from the inverter 56 and a n-enable input that receives a signal from the inverter 65. The function of the CMOS pass gate 58, the inverter 65, the inverter 68, the inverter 70 and the enabled inverter 72 is to provide a latch that continues to drive the WREQOUT output 34 until the output of the inverter 56 changes digital states. It should be appreciated that this latching function can be implemented using other components that provide a similar function.

Figure 3:
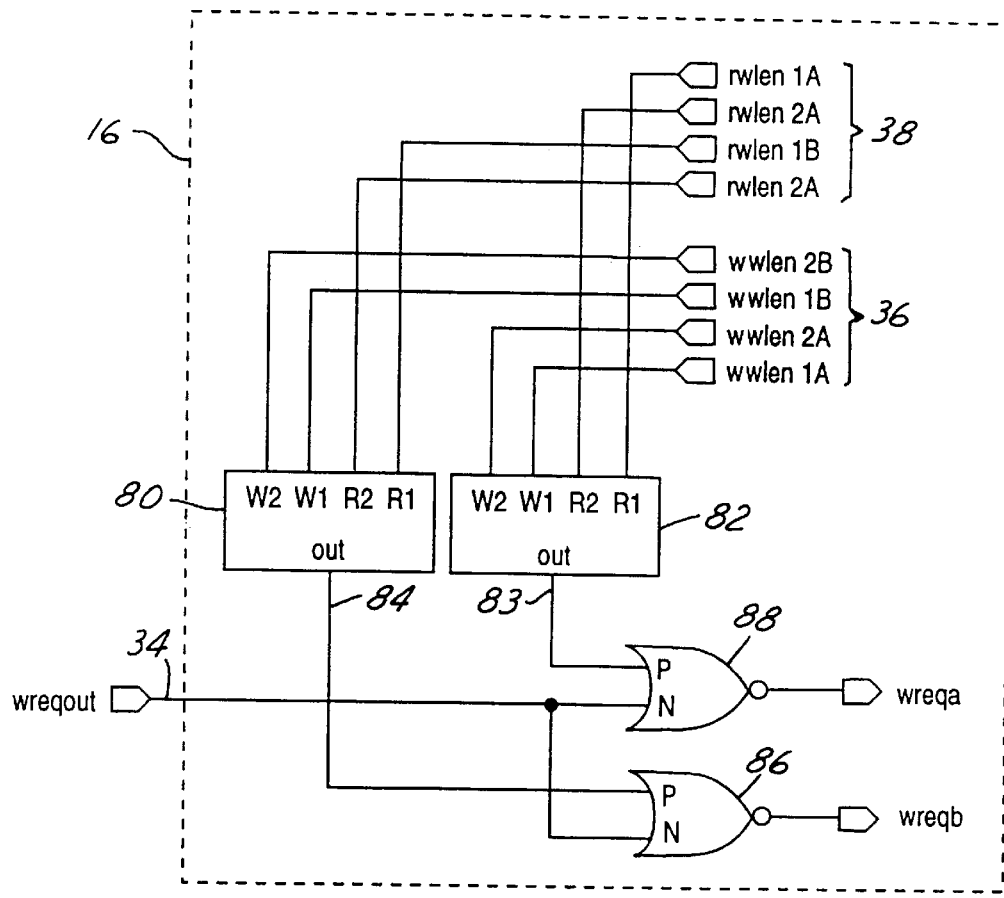
FIG. 3 is a schematic diagram of the section equality qualifying logic.

Referring to FIG. 3, a more detailed block diagram of the section equality qualifying logic 16 is shown. The write section word line enable bus input 36 of FIG. 1 and is represented as an input wwlen2B, an input wwlen1B, an input wwlen2A and an input wwlen1A. The read section word line enable bus input 38 of FIG. 1 is represented as an input rwlen1A, an input rwlen2A, an input rwlen1B and an input rwlen2B. A gate logic block 80 receives a first input W2 from the wwlen2B, a second input W1 from the input wwlen1B, a third input R2 from the input rwlen2B and a fourth input R1 from the input rwlen 1B. A gate logic block 82 receives a first input W2 from the input wwlen2A, a second input W1 from the input wwlen1A, a third input R2 from the input rwlen2A and a fourth input R1 from the input rwlen1A. The gate logic block 80 provides an output 84 that is presented to a first input of a NOR gate 86. The gate logic block 82 presents an output 83 to a first input of a NOR gate 88. The NOR gate 86 and the NOR gate 88 each receive a second input from the WREQOUT output 34 of the glitch filter 14 The NOR gate 88 presents a output WREQA and the NOR gate 86 presents an output WREQB. The output WREQA and the output WREQB correspond to the outputs 40a–40n illustrated in FIG. 1 It should be appreciated that FIG. 3 is a specific example illustrating two WREQ outputs. Any desired number of WREQ outputs can be implemented by increasing the read word line enable input signals and the write word line enable input signals.

The implementation of the read word line enable input signals and the write word line enable input signals in the context of a two section memory array having N rows is illustrated by the following TABLE 1:

TABLE 1

|         | Section A | Section B |
|---------|-----------|-----------|
| Row 0   | wlen1A    | wlen1B    |
| Row 1   | wlen2A    | wlen2B    |
| Row 2   | wlen1A    | wlen1B    |
| Row 3   | wlen2A    | wlen2B    |
| Row 4   | wlen1A    | wlen2B    |
| Row 5   | wlen2A    | wlen2B    |
|         |           |           |
|         |           |           |
| Row N-1 | wlen1A    | wlen1B    |
| Row N   | wlen2A    | wlen2B    |

Figure 4:
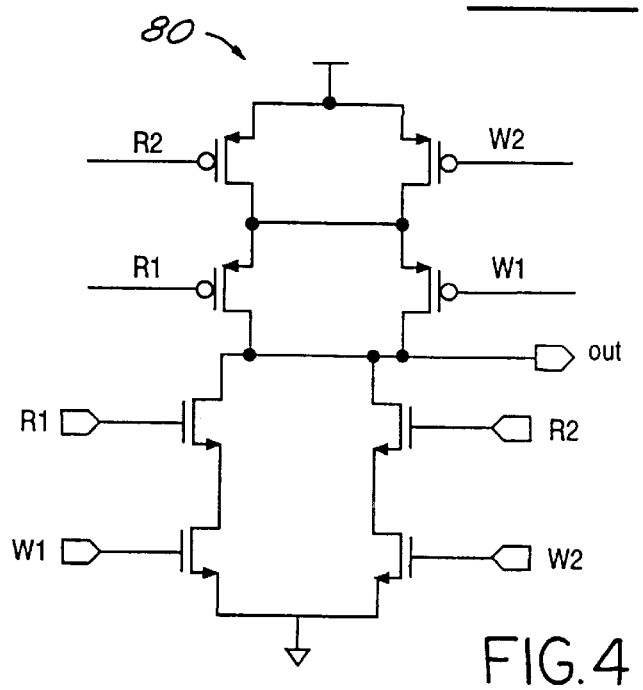
FIG. 4 is a schematic diagram of the gate logic of FIG. 3.

Referring to FIG. 4, the internal logic of the gate logic blocks 80 and 82 is shown. The gate logic blocks 80 and 82 each receive a first input W2, a second input W1, a third input R2 and a fourth input R1 and presents an output 83 or 84. The internal logic of the gate logic blocks 80 and 82 is implemented using a number of CMOS transistors. It should be appreciated that other logic implementations that produce similar results can be substituted without departing from the spirit of the present invention. Specifically, if the R1 input equals digital logic high and the W1 input equals digital logic high then the output 83 or 84, depending on the particular gate logic block 80 or 82, will equal digital logic low and will present a control signal to the NOR gate. Similarly, if the input R2 equals digital logic high and the input W2 equals digital logic high then the output 83 or 84 will equal digital logic low and will present a control signal to the NOR gate 88 or 86. The output of the gate logic blocks 80 and 82 enables the NOR gates 86 and 88 and ultimately produces the outputs WREQA and WREQB if the input signal 34 is also digital logic low. The following TABLE 2 illustrates the layout of a FIFO having a two section memory array where each cell contains eight words. This is illustrated by the following equations:

$$WREQA = (rwlen1A \text{ AND } wwlen1A) \text{ OR } (rwlen2A \text{ AND } wwlen2A) \quad \text{EQ1}$$

$$WREQB = (rwlen1B \text{ AND } wwlen1B) \text{ OR } (rwlen2B \text{ AND } wwlen2B) \quad \text{EQ2}$$

This logic is valid when the read and write pointers are close. It should be appreciated that the specific example two section memory is for illustrative purposes only. Larger or smaller numbers of memory arrays as well as larger or smaller numbers of words can be implemented.

TABLE 2

| A1 | B1 |
|----|----|
| A2 | B2 |
| A1 | B1 |
| A2 | B2 |

The TABLE 3 illustrates an example of the present invention having an offset equal to 10, which is equal to the number of words in the section plus two look-ahead cycles.

TABLE 3

|   |   |   |   |   | wlen1A turns off |   |   |   |    |    |    |    | wlen1B turns off |    |    |
|---|---|---|---|---|---|---|---|---|----|----|----|----|----|----|----|
| wlen1B turns on | | | | | | | | | | | wlen 2A turns on | | | | |
| ↓ | | | | ↓ | | | | | | | ↓ | | | ↓ | |
| 1 | 2 | 3 | 4 | 5 | 6 | 7 | 8 | 9 | 10 | 11 | 12 | 13 | 14 | 15 | 16 |
| 1 | 2 | 3 | 4 | 5 | 6 | 7 | 8 | 9 | 10 | 11 | 12 | 13 | 14 | 15 | 16 |
| ↑ | | | | ↑ | | | | | | | ↑ | | | ↑ | |
| wlen2B turns on | | | | | | | | | | | wlen1A turns on | | | | |
| | | | | wlen2A turns off | | | | | | | | | wlen2B turns off | | |

TABLE 3 shows the functioning of the read-word line enable timing. Each cell in TABLE 3 represents a completed read cycle to the FIFO. Two rows in TABLE 3 are to signify reading 32 words from the FIFO where each section has eight words to a particular row. For this example TABLE 3 illustrates 8 words read from section A and eight words read from section B corresponding to the first physical row in the FIFO memory array. After resetting the FIFO, wlen 1A is activated. On the sixth read from the FIFO, wlen1B is activated. This is noted by the arrow above cell 6 in the first row of TABLE 3. It should be noted that wlen 1A is still activated. On the eight read from the FIFO, wlen1A is de-activated. The ninth word can be read from the FIFO on the next read cycle since the "B" section wordline (wlen1B) has been activated at cycle 6 (i.e two look ahead cycles). In the example of eight words, wlen1B signal will continue to be active in the FIFO until the reference number sixteen. It should be noted that at the reference number fourteen, the wlen2A turns on two clock cycles ahead of when the wlen1B turns off. This is the preset offset 22 that is programmed during chip manufacturing. The preset offset 22 allows the programmable global WREQ generator 12 to generate the WREQint signal 28. The WREQint signal, when combined with the wordline enable signals in the section equality qualifying logic 16, generates WREQ signals that can be used to control any special processing circuitry that handles when the write and read wordlines are in close proximity to each other.

It should be noted that the above example is for illustrative purposes only. The exact turn-on, turn-off and preset offset values may vary with a particuliar implementation.

It is to be understood that modifications to the invention might occur to one with skill in the field of the invention within the scope of the appended claims.

We claim:

1. A circuit comprising:
    a FIFO buffer having a plurality of write enable signals, a plurality of read enable signals, a read pointer and a write pointer;
    a first circuit configured to generate an internal signal indicating when said read pointer is within a specified offset of said write pointer in response to (i) a first input coupled to said write pointer, (ii) a second input coupled to said read pointer and (iii) an offset input for receiving said specified offset;
    a logic circuit configured to generate a read write equality signal in response to (i) said internal signal, (ii) said plurality of write enable signals and (iii) said plurality of read enable signals.

2. The circuit according to claim 1 wherein said read write equality signal comprises a plurality of independent read write equality signals.

3. The circuit according to claim 1 wherein said FIFO comprises a plurality of memory sections each having a number of rows, each of said memory sections comprises a fixed number of words in a particular one of said rows.

4. The circuit according to claim 3 wherein said read write equality signal comprises a plurality of independent read write equality signals corresponding to each of the plurality of memory sections.

5. The circuit according to claim 1 further comprising a filter circuit configured to hold said internal signal at one digital state for a predetermined time.

6. The circuit according to claim 1 wherein said offset is programmable.

7. The circuit according to claim 1 wherein said offset is programmable through a metal mask during fabrication.

8. The circuit according to claim 3 wherein said offset is equal to (i) the size of said fixed number of words in a particular one of said rows (ii) times the number of said memory sections, (iii) plus a predetermined look ahead offset.

9. The circuit according to claim 8 wherein said offset is programmable.

10. The circuit according to claim 9 wherein said predetermined look ahead offset is programmable through a metal mask during fabrication.

11. The circuit according to claim 1 wherein said specified offset corresponds to a number of look ahead cycles.

12. Added the circuit according to claim 11 wherein said number of look ahead cycles corresponds to a difference between said read pointer and said write pointer.

13. Added The circuit according to claim 11 wherein said FIFO comprises a plurality of memory sections each of which contains a portion of at least one row, said at least one row comprising a plurality of portions equal to said plurality of sections.

* * * * *